Oct. 14, 1969    G. R. GODFREY    3,472,292
DISPENSING DEVICE FOR GASES UNDER PRESSURE
Filed May 22, 1968    2 Sheets-Sheet 1

INVENTOR.
GORDON REGINALD GODFREY
BY Jacobs & Jacobs
ATTORNEYS

United States Patent Office 3,472,292
Patented Oct. 14, 1969

3,472,292
DISPENSING DEVICE FOR GASES UNDER PRESSURE
Gordon Reginald Godfrey, Carshalton, Surrey, England, assignor to The Distillers Company (Carbon Dioxide) Limited, Reigate, Surrey, England
Filed May 22, 1968, Ser. No. 731,053
Claims priority, application Great Britain, May 25, 1967, 24,270/67
Int. Cl. F17b 5/00; F16k 31/143
U.S. Cl. 141—197                                    4 Claims

ABSTRACT OF THE DISCLOSURE

A dispensing device particularly for supplying carbon dioxide under pressure to a range of appliances comprises means for connecting it to a source of high pressure carbon dioxide, a reducing valve controlled by a regulator which also controls adjustable means which only allow the dispenser to be connected to an appliance which operates at the pressure to which the regulator is set.

---

This invention relates to a dispensing device for gases under pressure and in particular to a dispenser for the supply of carbon dioxide to domestic and similar appliances operated by carbon dioxide under pressure.

There are a number of such appliances operated by carbon dioxide already available, for example soda syphons, fire extinguishers, dinghy, life-raft and tyre inflators. These appliances are normally recharged or operated from containers of high pressure carbon dioxide. Some of the appliances operate at lower pressures than others and as a consequence require different recharging or operating techniques. It is anticipated that more and more carbon dioxide-operated appliances will be introduced into the domestic market and the need for a universal carbon dioxide dispenser is becoming increasingly apparent.

It is an object of this invention to provide such a dispenser which is capable of supplying carbon dioxide at any desired pressure less than that of the source.

According to the present invention the dispenser for the supply of carbon dioxide to a range of domestic appliances operating at different pressures comprises in combination:

An adjustable connecting device for releasably attaching the dispenser to any of the appliances, which device contains a conduit for leading the carbon dioxide from the dispenser to the appliance, at a pressure selected according to the requirements of the appliance, Means for connecting the dispenser to a source of carbon dioxide at high pressure, A pressure reducing valve between the source of high pressure carbon dioxide and the carbon dioxide conduit, A regulator for setting the reducing valve to give carbon dioxide at any selected reduced pressure on the discharge side of the valve, which regulator has a linkage between it and the connecting device so that the connecting parts of the latter are altered as the position of the regulator is altered whereby at any one pressure-indicating position of the regulator the connecting device is so adjusted that it can only be connected to an appliance with a corresponding mating means which is only fitted to appliances which operate at the carbon dioxide pressure indicated by that position on the regulator, and A manually-operated valve for discharging carbon dioxide at the selected pressure through the conduit to the appliance.

The adjustable connecting device may be for instance the plug part of a "bayonet" joint of which the socket part is located on the appliance. In this case each type of appliance which operates at one particular pressure of carbon dioxide will have a socket of the same design. Types operating at another pressure will have a socket of a different design. The plug part of the joint will have the usual projecting pins but the positions of these pins will be adjustable so that they can occupy a number of different positions which correspond to the different designs of the sockets.

Adjustment of the position of the pins is effected for instance by a mechanical linkage system between them and the regulator which controls the pressure-reducing valve.

In a particular example a rack and pinion device is attached to the regulator and is linked to the pins on the connecting device. The pins are then caused to move coaxially towards or away from the end of the device as the position of the regulator is altered. The pins can also be arranged to move diametrically so that the overall distance between the tips of the pins can be varied. By providing appliances which require pressures of a certain value with bayonet sockets of a certain height and depth corresponding to the position of the pins on the plug part of the joint, delivery of carbon dioxide at only the correct pressure will be ensured.

Alternatively other quick acting coupling devices or screw threads can be used for connecting the dispenser to the appliance.

In all cases, however, mating parts are provided on the dispenser and the appliance, those on the dispensers being adjustable and those on the appliances being fixed and different for each different pressure.

In this way it is not possible to use the dispenser to supply carbon dioxide at any pressure other than that at which any particular appliance is designed to operate.

The means for connecting the dispenser to a source of carbon dioxide at high pressure is any suitable coupling device such as mating screw threads or a bayonet joint. Its selection will depend on the nature of the source of high pressure carbon dioxide which in many instances will be a small high pressure cylinder. Where necessary the joint will incorporate a device for puncturing a seal on the container or operating a resealable valve (e.g. a spring-loaded shut-off valve) to release the carbon dioxide into the dispenser.

The pressure-reducing valve may be of the piston or diaphragm type but it is preferably a valve having a large orifice to diaphragm or piston ratio in order to gain fine control, and should preferably be fitted with a filter on the inlet side. It is preferably releasably attached to a source of high pressure carbon dioxide, but alternatively it could be integral with a refillable container which can be filled from a source of low or high pressure carbon dioxide.

The manually-operated valve is conveniently a trigger-operated poppet valve. Another type which is suitable is the press-button type of valve.

Preferably the dispenser is provided with a safety relief valve of adequate capacity on the low pressure side of the pressure-reducing valve.

A particular embodiment of the present invention will now be described with reference to the accompanying drawing in which FIGURE 1 represents a section through a carbon dioxide dispenser according to the present invention.

Figure 1:
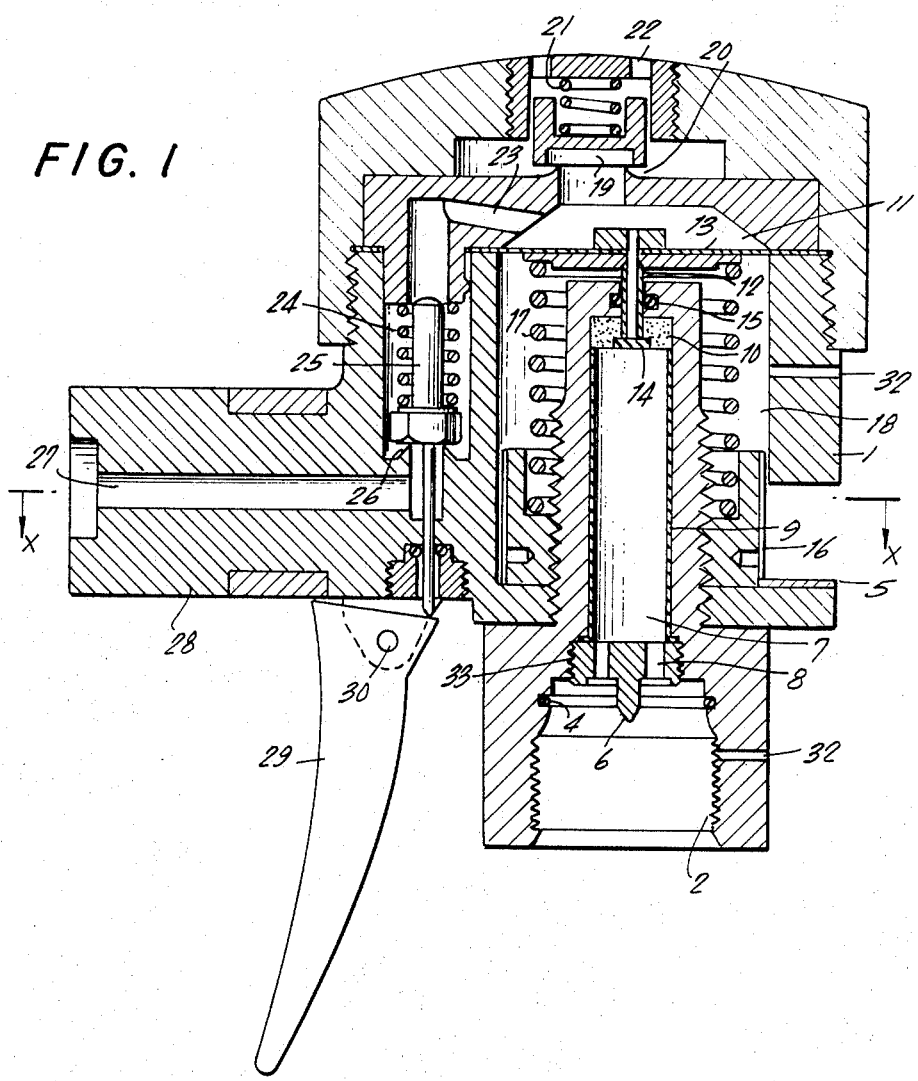
Figure 2:
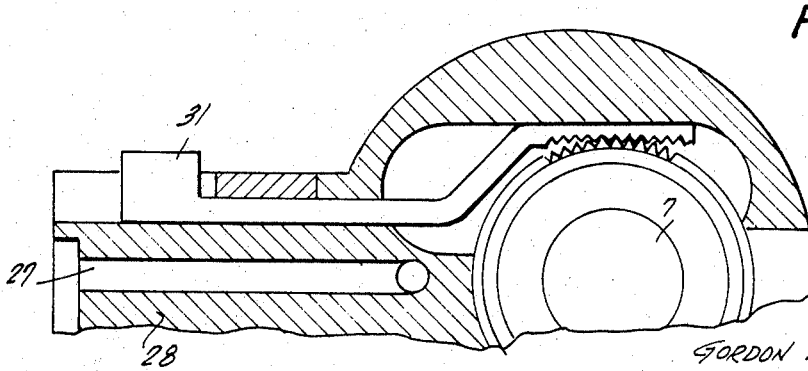
FIGURE 2 is a sectional plan on the line X—X of FIGURE 1.
Figure 3:
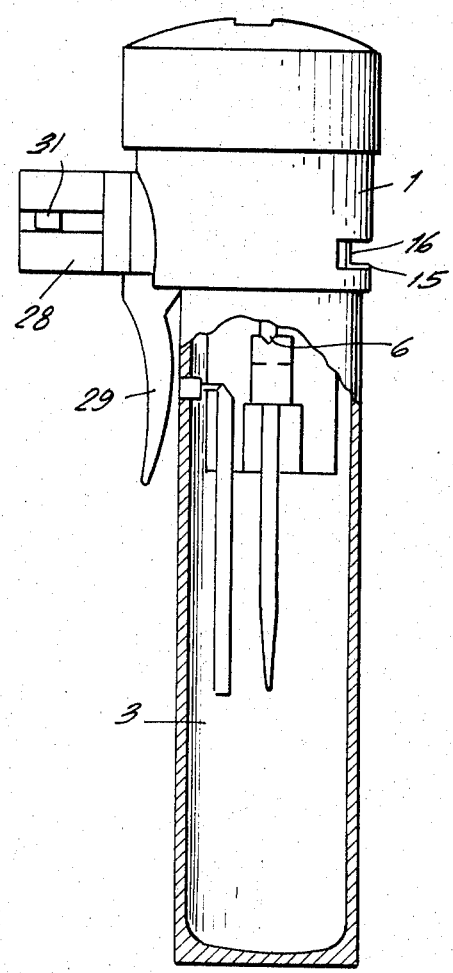
FIGURES 3 and 4 are views of arrangements of a high pressure container fitted to the device.
Figure 4:
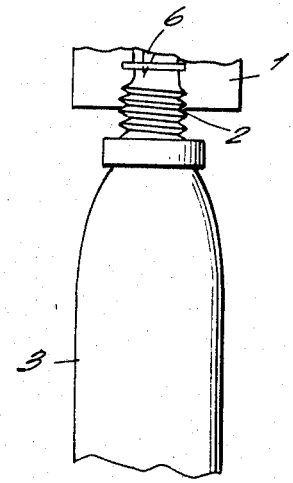

The dispenser has a body 1 provided with female screw thread 2 into which is screwed a container of high pressure carbon dioxide 3 that is pierced or broached by an actuator 6.

The actuator 6 communicates with the high pressure chamber 7 via passages 8 and spaced apart from the actuator 6 by means of a cylindrical spacer 9 is a sintered metal plug 10. The high pressure chamber 7 communicates with a low pressure chamber 11 via a capillary tube 12 which is retained by a diaphragm 13 and which when the pressure in the low pressure chamber reaches a predetermined value makes gas-tight contact with a valve seat 14 housed within the sintered metal plug 10. The high pressure chamber 7 is sealed with O rings 4 and 15 and joint 33.

The predetermined pressure at which the capillary tube 12 seats against the valve seat 14 is controlled by a pressure regulator 16 having a spring 17 housed within it and bearing on the underside of the diaphragm 13. The regulator 16 is slidably housed in a chamber 18 within the body 1 and surrounding the high pressure chamber 7. The position of the regulator 16 in the chamber 18 is selected on an indicator 5 similar to that provided for a gas cooker regulator.

The low pressure chamber 11 is provided with a safety valve 19 which is urged against a seating 20 in the wall of the low pressure chamber 11 by means of a spring 21. When the pressure in the low pressure chamber exceeds the force of the spring 21 gas vents to the atmosphere through a vent 22.

Low pressure carbon dioxide passes from the low pressure chamber 11 via passage 23 to a discharge chamber 24 provided with a poppet valve 25 which seats on a valve seating 26 communicating with a discharge passage 27 in a connector 28. The poppet valve is operated by means of a trigger 29 pivoted at 30 and when the poppet valve is open gas issues from the passage 27.

The connector 28 is provided with pins 31 adapted to cooperate with a bayonet socket on a carbon dioxide operated appliance. Vents 32 are provided to prevent any buildup of high pressure carbon dioxide in the dispenser other than in high pressure chamber 7.

The mode of operation of the dispenser will now be described. A container of carbon dioxide 3 is screwed into the body of the dispenser by engaging the female screw thread 2. As the canister is screwed into the body, the actuator 6 broaches the container thereby permitting high pressure carbon dioxide to fill the high pressure chamber 7 via the passage 8. High pressure carbon dioxide passes through the sintered metal plug 10, through the capillary tube 12 to the low pressure chamber 11 and finally into the discharge chamber 24. Carbon dioxide continues to pass until the pressure in the low pressure chamber 11 exceeds the pressure of the spring 17 upon the diaphragm 13. When this happens the capillary tube is forced against the valve seating 14 cutting off the passage of further carbon dioxide from the high pressure chamber 7. The pressure at which this cutting off takes place is controlled by the setting of the spring 17 which in turn is controlled by the position of the regulator 16 in the chamber 18, the position of the regulator being controlled by a manually operated dial (not shown) geared to the regulator. The dial may indicate the range of pressures obtainable from the dispenser or it may be marked with some arbitrarily chosen range. By turning the dial to the appropriate position carbon dioxide may be dispensed at the required pressure.

Should the pressure build up to a dangerous level in the low pressure chamber 11, the safety valve 19 will be lifted off its valve seating 20 against the spring 21 and carbon dioxide will be vented to atmosphere through vent 22.

To refill or operate an appliance the dispenser is adjusted to dispense carbon dioxide at the pressure required by setting the dial to the appropriate position, the connector of the dispenser is attached to the appliance by engaging the pins 31 in a bayonet socket on the appliance, and the trigger 29 is pressed permitting carbon dioxide to flow past the poppet valve 26 to the appliance. As the pressure in the low pressure chamber falls below the selected pressure the capillary tube 12 moves away from the valve seating 14 and permits high pressure carbon dioxide to pass into the low pressure chamber 11 until the pressure in the low pressure chamber reaches the selected pressure when the capillary tube 12 will return to the valve seat 14. When it is desired to cut off the supply of carbon dioxide to the appliance the trigger 29 is released.

What I claim is:

1. A dispenser for the supply of carbon dioxide to a range of domestic appliances operating at different pressures which comprises in combination,
    an adjustable connecting device for releasably attaching the dispenser to any of the appliances which device contains a conduit for leading the carbon dioxide from the dispenser to the appliance, at a pressure selected according to the requirements of the appliance,
    means for connecting the dispenser to a source of carbon dioxide at high pressure,
    a pressure reducing valve between the source of high pressure carbon dioxide and the carbon dioxide conduit,
    a regulator for setting the reducing valve to give carbon dioxide at any selected reduced pressure on the discharge side of the valve, which regulator has a linkage between it and the connecting device so that the connecting parts of the latter are altered as the position of the regulator is altered whereby at any one pressure-indicating position of the regulator the connecting device is so adjusted that it can only be connected to an appliance with a corresponding mating means which is only fitted to appliances which operate at the carbon dioxide pressure indicated by that position on the regulator, and
    a manually operated valve for discharging carbon dioxide at the selected pressure through the conduit to the appliance.

2. A dispenser as claimed in claim 1 wherein the connecting device comprises part of a bayonet joint the other part of which is on the appliance.

3. A dispenser as claimed in claim 1 in which the means for connecting the dispenser to a source of high pressure carbon dioxide contains a device for broaching the seal on a high pressure container.

4. A dispenser as claimed in claim 1 which includes a safety valve on the low pressure side of the pressure reducing valve.

References Cited

UNITED STATES PATENTS

| | | | |
|---|---|---|---|
| 1,876,355 | 9/1932 | Smith | 137—505.25 |
| 3,208,574 | 9/1965 | Anson | 141—197 X |

ROBERT B. REEVES, Primary Examiner

H. S. LANE, Assistant Examiner

U.S. Cl. X.R.

137—505.25; 222—5